US011503768B2

(12) United States Patent
Yoshimura et al.

(10) Patent No.: US 11,503,768 B2
(45) Date of Patent: Nov. 22, 2022

(54) LAWN MOWER HAVING A MAINTENANCE TOOL FOR MAINTAINING A CUTTING BLADE

(71) Applicant: HONDA MOTOR CO., LTD., Tokyo (JP)

(72) Inventors: Hajime Yoshimura, Saitama (JP); Nobuo Yamazaki, Saitama (JP); Kenta Kohigashi, Saitama (JP); Ryota Hisada, Tokyo (JP); Makoto Uchimi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 220 days.

(21) Appl. No.: 16/800,693

(22) Filed: Feb. 25, 2020

(65) Prior Publication Data

US 2020/0305342 A1    Oct. 1, 2020

(30) Foreign Application Priority Data

Mar. 28, 2019  (JP) .............................. JP2019-062682

(51) Int. Cl.
| *A01D 75/08* | (2006.01) |
| *A01D 34/03* | (2006.01) |
| *A01D 34/63* | (2006.01) |
| *A01D 34/13* | (2006.01) |
| *A01D 34/00* | (2006.01) |
| *A01D 101/00* | (2006.01) |
| *A01D 34/82* | (2006.01) |

(52) U.S. Cl.
CPC ........... *A01D 75/08* (2013.01); *A01D 34/001* (2013.01); *A01D 34/03* (2013.01); *A01D 34/13* (2013.01); *A01D 34/63* (2013.01); *A01D 34/82* (2013.01); *A01D 2101/00* (2013.01)

(58) Field of Classification Search
CPC ...... A01D 34/00; A01D 34/001; A01D 34/73; A01D 34/733; A01D 34/81; A01D 34/82; A01D 34/63; A01D 2101/00; A01D 75/08
See application file for complete search history.

(56) References Cited

U.S. PATENT DOCUMENTS 2,826,032 A *  3/1958  Hayes .................... A01D 75/08
                                                  56/255
3,136,107 A *  6/1964  Spear ...................... B24B 3/365
                                                  56/12.1

(Continued)

FOREIGN PATENT DOCUMENTS

| EP | 0997066 A1 * | 5/2000 | ............. A01D 75/08 |
| JP | 2001-000025 A | 1/2001 | |
| JP | 2016-120583 A | 7/2016 | |

*Primary Examiner* — Adam J Behrens
(74) *Attorney, Agent, or Firm* — Paratas Law Group, PLLC (57) ABSTRACT

A lawn mower includes: a rotation shaft coupled to a power source and extending in an approximately vertical direction; a blade configured to rotate integrally with the rotation shaft; and a housing having a downward opening and accommodating the blade such that the blade is rotatable; and a maintenance tool provided on the housing, the maintenance tool being contactable with the blade from the above. A cutting portion of the blade is capable of moving between a maintenance position at which the cutting portion is contactable with the maintenance tool and an operating position at which the cutting portion mows a lawn.

5 Claims, 7 Drawing Sheets

(56) References Cited

U.S. PATENT DOCUMENTS

| | | | | |
|---|---|---|---|---|
| 3,225,527 | A * | 12/1965 | Spear | A01D 75/08 56/12.1 |
| 3,738,092 | A * | 6/1973 | Spear | A01D 34/001 56/12.1 |
| 4,285,169 | A * | 8/1981 | Franklin | B24B 3/368 451/423 |
| 5,237,803 | A * | 8/1993 | Domingue, Jr. | A01D 34/001 239/DIG. 6 |
| 6,467,247 | B1 * | 10/2002 | Harrison | A01D 34/001 56/320.1 |
| 8,348,722 | B2 * | 1/2013 | Arnold | B24D 15/06 451/45 |
| 10,070,578 | B2 * | 9/2018 | Kuriyagawa | A01D 34/63 |
| 10,813,285 | B2 * | 10/2020 | Kuriyagawa | A01D 34/826 |
| 2003/0024221 | A1 * | 2/2003 | Williams | A01D 34/001 56/1 |
| 2017/0245429 | A1 * | 8/2017 | Kuriyagawa | A01D 43/0631 |
| 2019/0335654 | A1 * | 11/2019 | Ito | A01D 34/73 |

* cited by examiner

LAWN MOWER HAVING A MAINTENANCE TOOL FOR MAINTAINING A CUTTING BLADE

CROSS-REFERENCE TO RELATED APPLICATIONS

This application is based on and claims priority under 35 USC 119 from Japanese Patent Application No. 2019-062682 filed on Mar. 28, 2019, the contents of which are incorporated herein by reference.

TECHNICAL FIELD

The present invention relates to a lawn mower.

BACKGROUND ART

Examples of lawn mowers include a reel type lawn mower that cuts grass between a fixed blade and a spiral reel blade that rotates about a rotation shaft extending in an approximately horizontal direction and a rotary lawn mower that cuts grass with a blade that rotates about a rotation shaft extending in an approximately vertical direction.

In the lawn mowers, so-called white whiskers occur when sharpness of the reel blade or the blade is reduced, in which leaf tips of grass are crushed and Whitened, and an appearance of grass after lawn mowing may be reduced.

Patent Literature 1 (JP-A-2001-000025) discloses a reel type lawn mower capable of polishing a reel blade without selecting locations by attaching a grindstone instead of a fixed blade.

Patent Literature 2 (JP-A-2016-120583) discloses a charging station for a rotary autonomous traveling electric lawn mower including a polishing member that polishes a blade of the autonomous traveling electric lawn mower.

However, the blade in Patent Literature 2 can only be polished by the charging station. In addition, when mud or grass clippings adhere to the blade of the lawn mower, a user would rub the blade with a brush to clean the blade, which requires intensive labor.

Therefore, there is a need for a rotary lawn mower capable of easily maintaining a blade (polishing and cleaning the blade) without selecting locations.

The present invention provides a rotary lawn mower capable of maintaining a blade without selecting locations.

SUMMARY

A lawn mower related to the present invention includes: a rotation shaft coupled to a power source and extending in an approximately vertical direction; a blade configured to rotate integrally with the rotation shaft; and a housing having a downward opening and accommodating the blade such that the blade is rotatable; and a maintenance tool provided on the housing, the maintenance tool being contactable with the blade from the above. A cutting portion of the blade is capable of moving between a maintenance position at which the cutting portion is contactable with the maintenance tool and an operating position at which the cutting portion mows a lawn.

According to the present invention, the rotary lawn mower can maintain the blade without selecting locations.

DESCRIPTION OF EMBODIMENTS

Hereinafter, an embodiment of the present invention will be described with reference to FIGS. 1 to 7B. In the following description, a traveling direction of a lawn mower 10 is taken as front, a backward direction is taken as rear, and a direction orthogonal to a front-rear direction is taken as a left-right direction.

[Lawn Mower]

Figure 1:
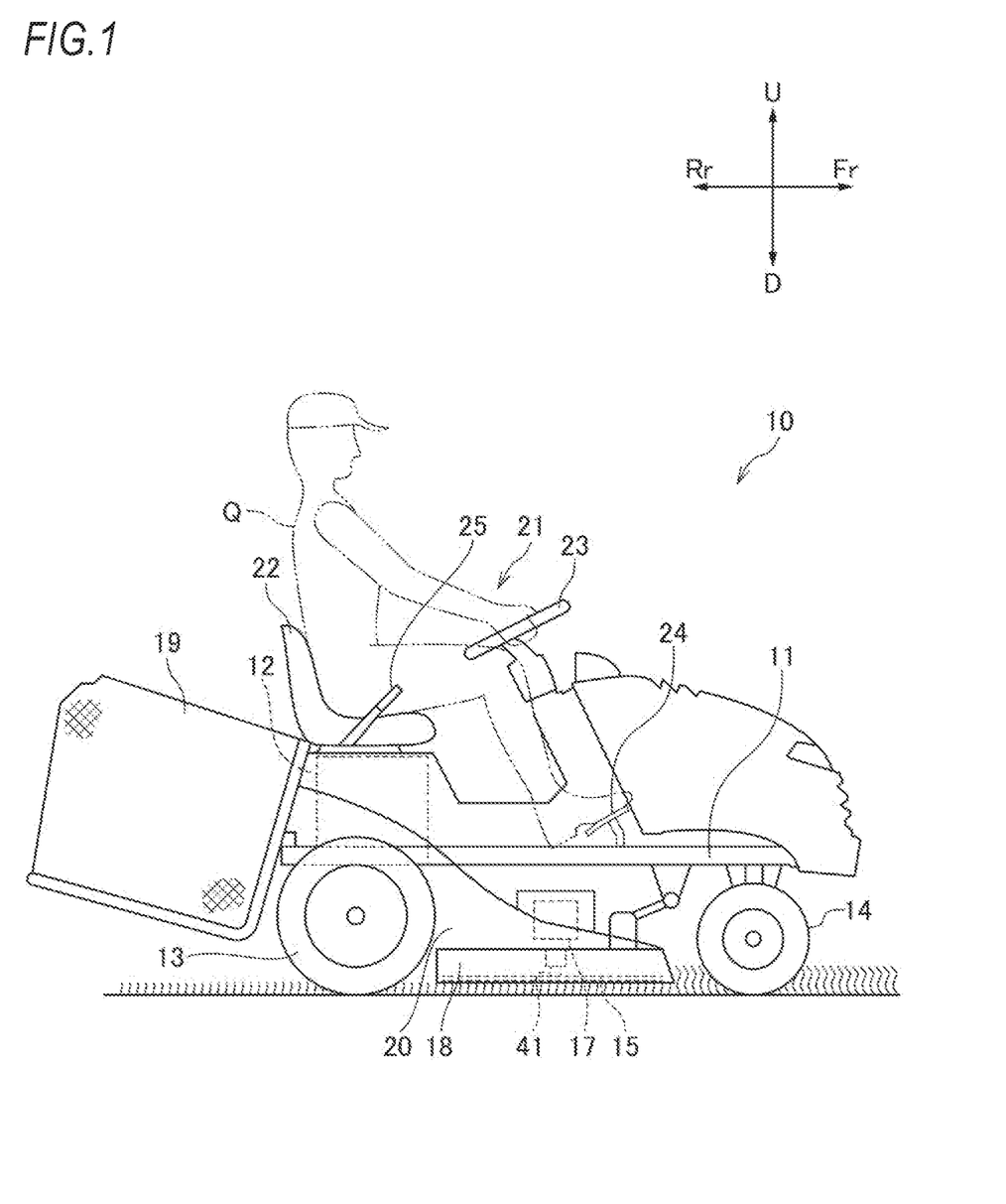
FIG. 1 is a side view of a lawn mower according to an embodiment of the present invention.

As shown in FIG. 1, the lawn mower 10 is a riding lawn mower and includes a mower body 11. The mower body 11 includes a traveling motor 12, left and right rear wheels 13 provided at a rear portion of the mower body 11 and driven by the traveling motor 12, left and right front wheels 14 provided at a front portion of the mower body 11, a blade 15 for lawn mowing provided at a lower portion of the mower body 11, a rotation shaft 41 extending in an approximately vertical direction and serving as a rotation center of the blade 15, a lawn mowing motor 17 that rotates the blade 15 via the rotation shaft 41, a housing 18 that covers at least a periphery of the blade 15 and guides grass clippings rearward, a grass bag 19 that stores grass clippings, a glass duct 20 that guides grass clippings from the housing 18 to the glass bag 19, and a riding portion 21 on which an operator Q rides.

The riding portion 21 includes a seat 22 on which the operator Q is seated, a steering handle 23 that steers the front wheels 14, an accelerator pedal 24 that controls an opening degree of an accelerator, and a traveling speed change lever 25 that controls vehicle speed.

During lawn mowing, the mower body 11 travels by the driving of the rear wheels 13 by the traveling motor 12 and the blade 15 is rotated by the lawn mowing motor 17. When the blade 15 rotates, grass is cut and air flow occurs and swirls in the housing 18. Accordingly, grass cut by the blade 15 rides in the air flow in the housing 18 and is collected in the glass bag 19 through the glass duct 20.

[Cutting Portion Position Changing Mechanism]

As shown in FIGS. 2 to 6D, the blade 15 according to the present embodiment includes a blade body 15a that rotates integrally with the rotation shaft 41 and a cutting portion 52 that is rotatable relative to the blade body 15a. A position of the cutting portion 52 may change corresponding to rotation of the cutting portion 52. The lawn mower 10 according to the present embodiment includes a cutting portion position changing mechanism 100 that rotates the blade 15 by a driving force of the lawn mowing motor 17 and changes the position of the cutting portion 52 by changing an angle of the cutting portion 52. The cutting portion position changing mechanism 100 will be described in detail below.

Figure 2:
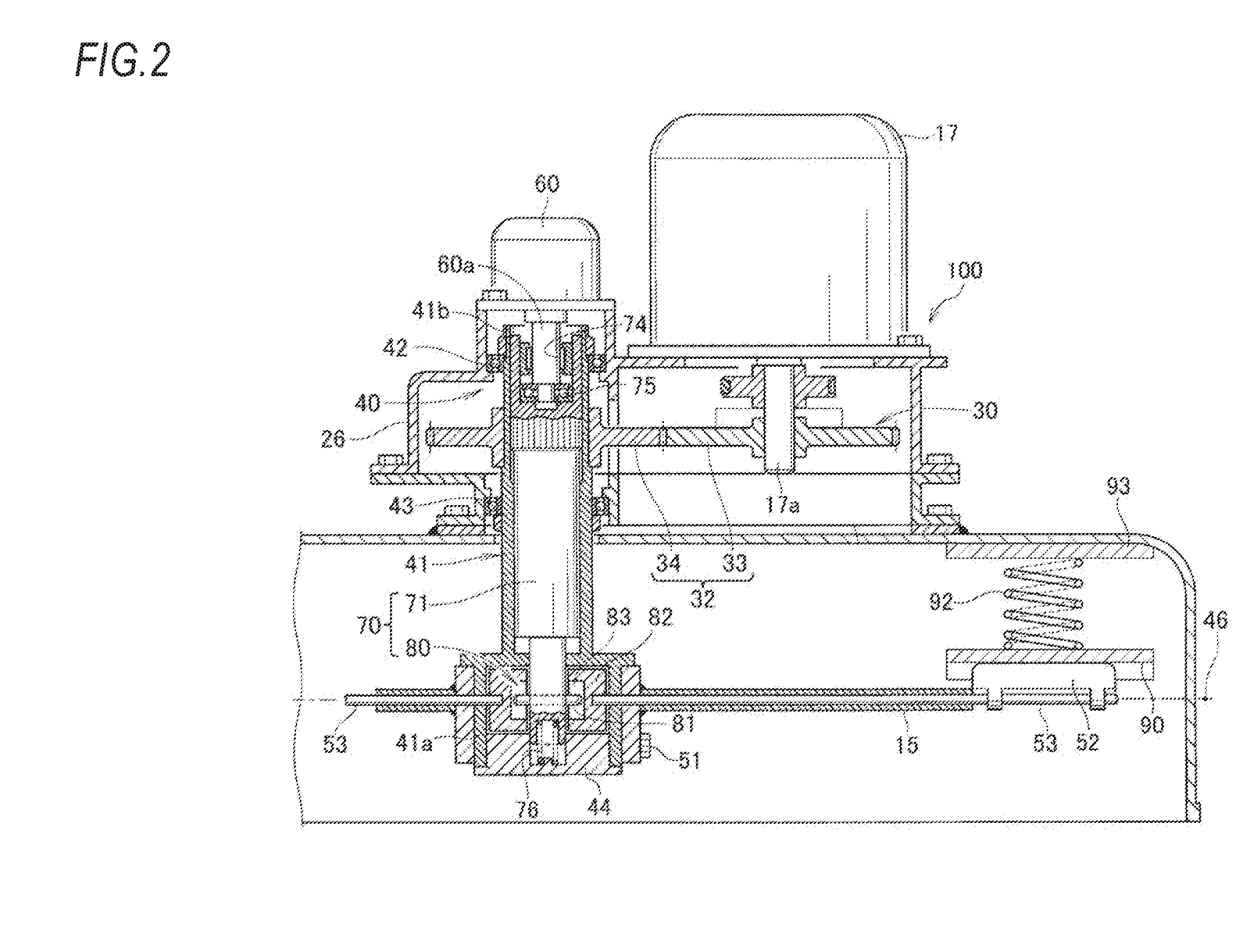
FIG. 2 is a sectional view of a cutting portion position changing mechanism mounted on the lawn mower of FIG. 1.
Figure 3:
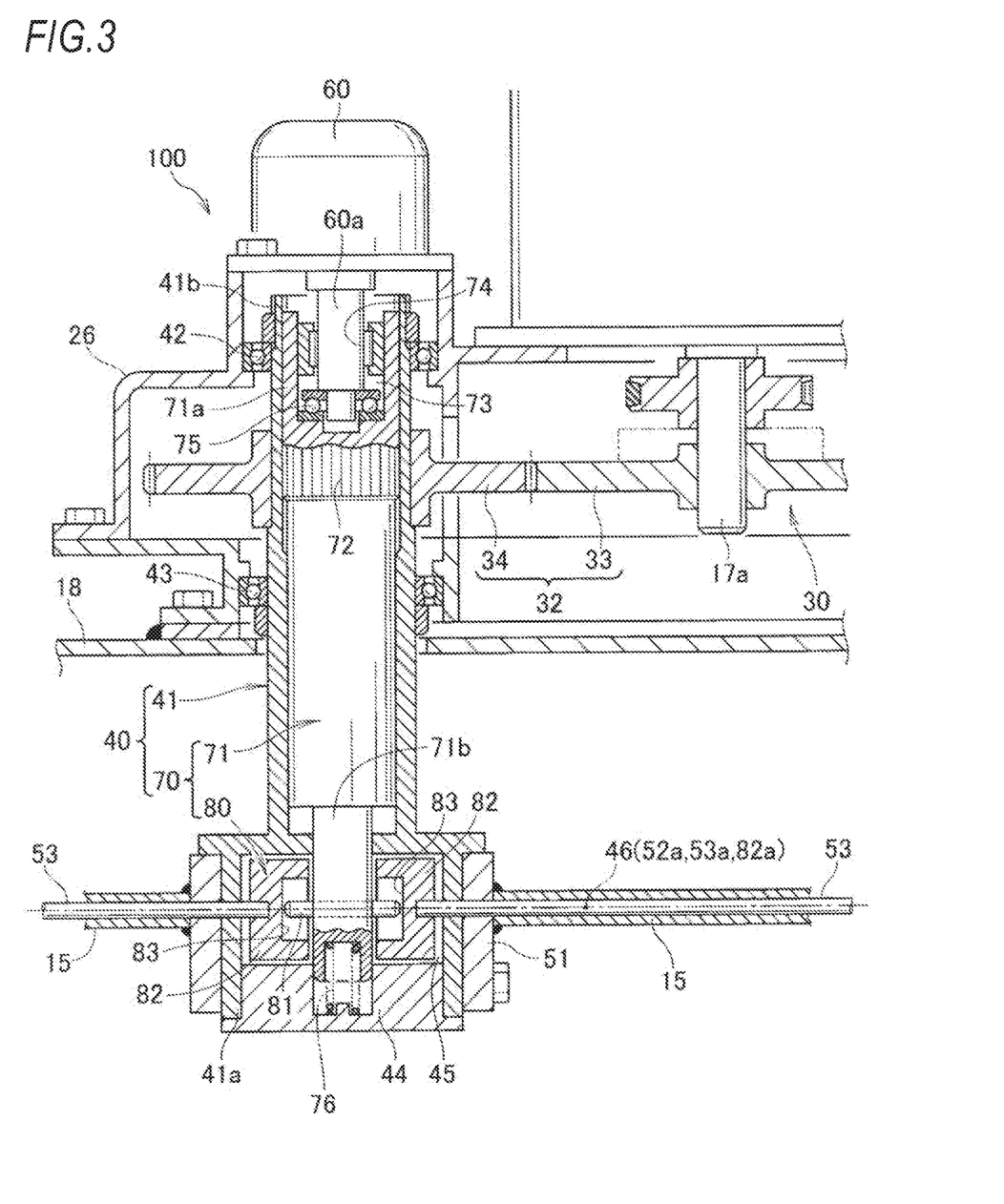
FIG. 3 is an enlarged sectional view of a main part of FIG. 2.

As shown in FIGS. 2 and 3, power generated by the lawn mowing motor 17 is transmitted to a cutter mechanism 40 by an operation power transmission system 30. A transmission mechanism 32 is interposed in the operation power transmission system 30 from the lawn mowing motor 17 to the rotation shaft 41 of the cutter mechanism 40. The transmission mechanism 32 includes a drive gear 33 and a driven gear 34. The drive gear 33 is attached to an output shaft 17a of the lawn mowing motor 17. The driven gear 34 is attached to an upper end portion 41b of the rotation shaft 41. The drive gear 33 and the driven gear 34 are formed of a spur gear.

The cutter mechanism 40 includes the rotation shaft 41 and a transmission mechanism 70. The transmission mechanism 70 will be described below. The rotation shaft 41 extends in a vertical direction of the housing 18 and is in parallel to the output shaft 17a of the lawn mowing motor 17. The rotation shaft 41 is rotatably supported on a stand 26 by bearings 42, 43 in a state of being restricted from moving in an axial direction. As a result, the rotation shaft 41 is rotatably supported to the housing 18 and is restricted from moving in the axial direction.

The rotation shaft 41 has a hollow shape. A lower end portion 41a of the rotation shaft 41 is located in the housing 18. The lower end portion 41a has a larger diameter than other portions of the rotation shaft 41 and has a substantial cup shape that opens downward. An open lower end surface of the lower end portion 41a is blocked by a cap 44. The cap 44 is detachably attached to the lower end portion 41a of the rotation shaft 41 by a fixing member such as a bolt. An inner side of the lower end portion 41a and the cap 44 define a space 45.

Figure 4:
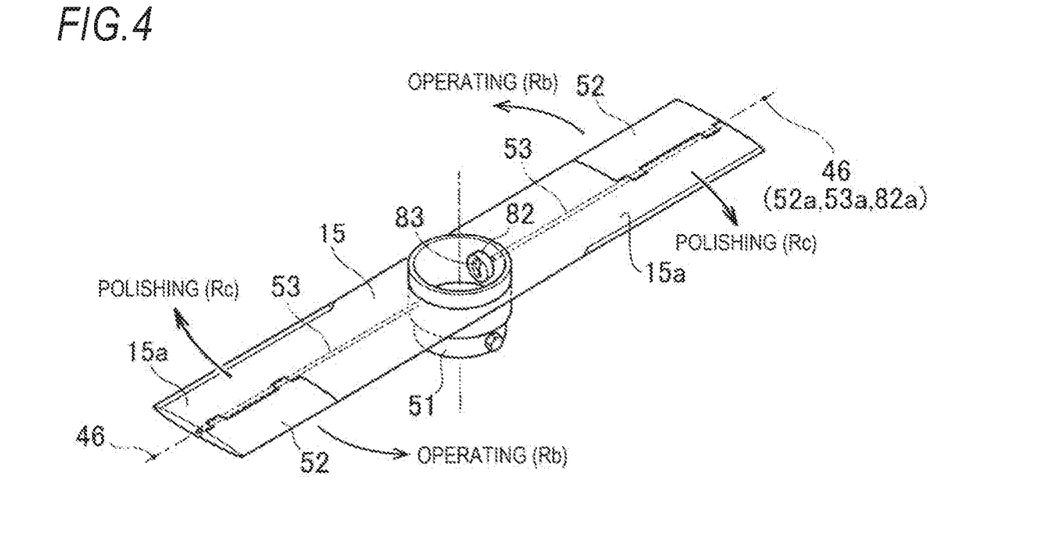
FIG. 4 is a perspective view of a blade.

As shown in FIG. 4, the blade 15 is provided on the rotation shaft 41 and is housed in the housing 18. The blade 15 is an elongated member having a substantially flat plate shape in a plan view and extending along a horizontal line 46 that is orthogonal (including approximately orthogonal) to the rotation shaft 41. The blade 15 includes an annular hub 51 at a center in a longitudinal direction of the blade 15. The hub 51 is an annular member fitted to an outer circumferential surface of the lower end portion 41a of the rotation shaft 41. The hub 51 is detachably attached to the lower end portion 41a by a fixing member such as a bolt. Therefore, the blade 15 is rotatable together with the rotation shaft 41.

The blade 15 includes a cutting portion 52 at least at a part thereof. Specifically, the blade 15 includes the cutting portion 52 at two end portions in the longitudinal direction of the blade 15. The cutting portion 52 is upstream in a rotation direction of the blade 15 during lawn mowing. The blade 15 is cut out by a space for the cutting portion 52.

The cutting portion 52 may change its upper-lower rotation angle along the horizontal line 46. Specifically, a pair of support shafts 53 are provided on the horizontal line 46. The pair of support shafts 53 are concentric with each other. One end portions of the pair of support shafts 53 pass through the hub 51 and extend to the space 45 of the lower end portion 41a of the rotation shaft 41. The one end portions of the support shafts 53 are rotatably supported by the hub 51 and are restricted from moving in an axially longitudinal direction of the support shafts 53.

As shown in FIGS. 2 and 3, a pair of cutting portions 52 are attached to the pair of support shafts 53. Therefore, the cutting portions 52 are rotatable up and down about the support shafts 53 accompanying rotation of the support shafts 53. Rotation angles of the cutting portions 52 are controlled by an output generated by an actuator 60. That is, the output of the actuator 60 is transmitted to the cutting portions 52 by the transmission mechanism 70. The transmission mechanism 70 is housed inside the rotation shaft 41. The transmission mechanism 70 includes a control shaft 71 and a conversion mechanism 80.

The control shaft 71 is fitted into the rotation shaft 41 such that the control shaft 71 is slidable in the axial direction of the rotation shaft 41 and is restricted from rotating relative to the rotation shaft 41. Specifically, the control shaft 71 is slidable relative to the rotation shaft 41 and is restricted from rotating relative to the rotation shaft 41 via a spline 72. In addition, a serration or a parallel key may be used instead of the spline 72.

The actuator 60 is formed by a linear actuator. That is, an output shaft 60a of the actuator 60 is slidable in an axial direction of the control shaft 71. The output shaft 60a and the control shaft 71 are concentric relative to the rotation shaft 41.

The output shaft 60a of the actuator 60 is combined with an upper end portion 71a of the control shaft 71 so as to slide and drive the control shaft 71. Specifically, an upper end of the control shaft 71 is formed with a recess 73 having a circular cross section that opens upward. The output shaft 60a of the actuator 60 is fitted into the recess 73.

A radial bearing 74 and a thrust bearing 75 are interposed between the output shaft 60a of the actuator 60 and the control shaft 71. An outer peripheral surface of the output shaft 60a is rotatably and slidably supported on an inner circumferential surface of the recess 73 by the radial bearing 74. A lower end surface of the output shaft 60a is rotatably in contact with a bottom surface of the recess 73 via the thrust bearing 75. With the output shaft 60a descending, the control shaft 71 can be slid downward via the thrust bearing 75.

A lower end portion 71b of the control shaft 71 extends into the space 45 and faces an upper surface of the cap 44. A compression coil spring 76 is interposed between a lower end surface of the control shaft 71 and the upper surface of the cap 44. The compression coil spring 76 biases the control shaft 71 toward the lower end surface of the output shaft 60a of the actuator 60. Therefore, the lower end surface of the output shaft 60a is always in contact with the bottom surface of the recess 73 via the thrust bearing 75. As the output shaft 60a ascends, the compression coil spring 76 may cause the control shaft 71 to slide upward. As a result, the control shaft 71 may slide up and down in the same direction as the output shaft 60a in synchronization with an upward and downward movement of the output shaft 60a of the actuator 60.

The conversion mechanism 80 is housed inside the rotation shaft 41 (the space 45) and converts the sliding movement of the control shaft 71 into a movement for changing the rotation angles of the cutting portions 52, that is, a rotation movement. That is, the lower end portion 71b of the control shaft 71 is coupled to the cutting portions 52 via the conversion mechanism 80.

The conversion mechanism 80 includes a pin 81 and a pair of cam portions 82. The pin 81 extends radially outward from the lower end portion 71b of the control shaft 71. For example, the pin 81 penetrates the lower end portion 71b in the radial direction.

Figure 5:
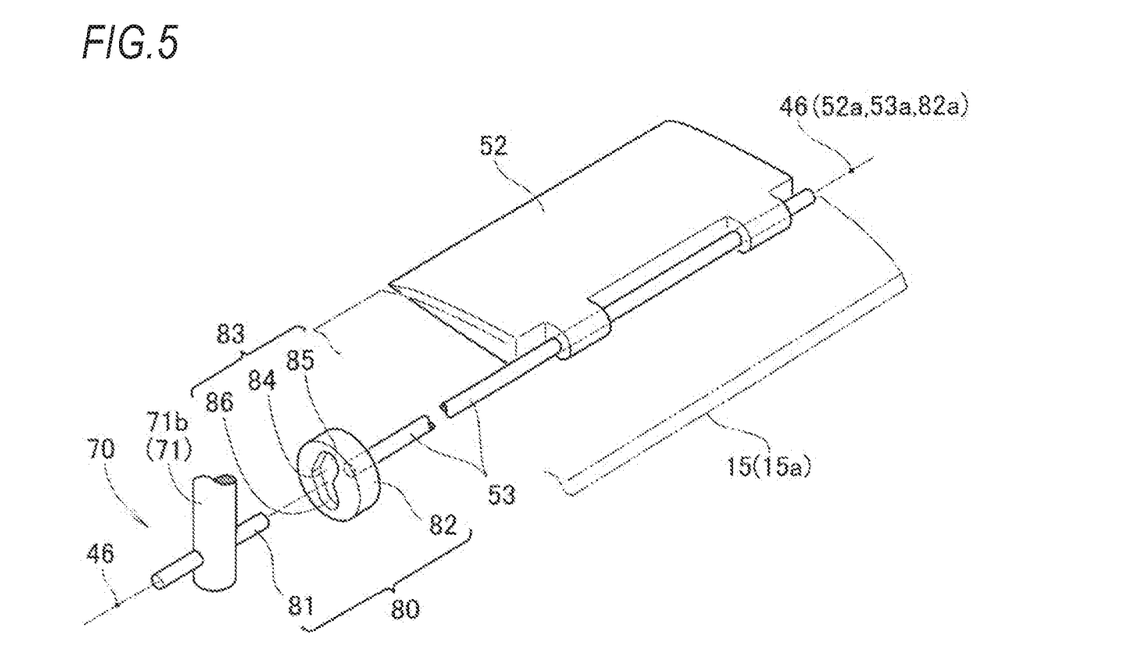
FIG. 5 is an exploded perspective view of a main part of the blade.

Referring also to FIGS. 4 and 5, the pair of cam portions 82 are disk-shaped members fixed to the one end portions of the pair of support shafts 53. The pair of cam portions 82 are supported on the lower end portion 41a of the rotation shaft 41 and are rotatable about the pair of support shafts 53. In this way, the pair of cam portions 82 are supported on the rotation shaft 41 and are rotatable relative to a rotation center 52a (the horizontal line 46) of the cutting portions 52, and are coupled to the cutting portions 52 via the support shafts 53.

The pair of cam portions 82 each include a cam groove 83 to which the pin 81 may contact. Cam grooves 83 face each other. Tip end portions of the pin 81 may contact the cam grooves 83. The cam grooves 83 may convert a sliding movement of the pin 81 that is displaced together with the control shaft 71 into a rotation movement of the cam portions 82.

The pin 81 may be displaced up and down while sliding on side surfaces of the cam grooves 83. As a result, the cam portions 82 rotate.

Figure 6A:
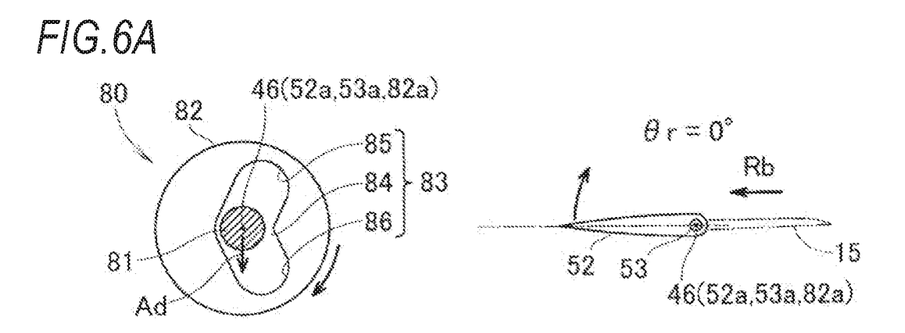
FIG. 6A is an explanatory view showing a relationship between an inclination angle of a cutting portion and a conversion mechanism when the cutting portion is in a horizontal state (rotation angle θr=0°), that is, in an operating position.

As shown in FIGS. 5 and 6A, the cam grooves 83 are formed in a substantially transverse V shape relative to the rotation center 52a of the cutting portions 52. Here, the rotation center 52a of the cutting portions 52 coincides with a center 53a of the support shafts 53 and a rotation center 82a of the cam portions 82 and extends along the horizontal line 46 orthogonal to the rotation shaft 41. Specifically, the cam grooves 83 each include a groove center 84 located on the rotation center 82a of the cam portions 82, an upper groove 85 extending upward and obliquely from the groove center 84, and a lower groove 86 extending downward and obliquely from the groove center 84. The groove center 84, the upper groove 85, and the lower groove 86 are continuous.

Next, an operation relationship between the conversion mechanism 80 and the cutting portion 52 will be described with reference to FIGS. 6A to 6D. FIG. 6A shows the relationship between the conversion mechanism 80 and the cutting portion 52 when the cutting portion 52 is in a horizontal state (rotation angle θr=0°. At this time, the pin 81 is located at the groove center 84 (the rotation center 82a of the cam portion 82). The blade 15 may cut grass by rotating the cutting portion 52 in the horizontal state in a direction indicated by an arrow Rb.

Figure 6B:
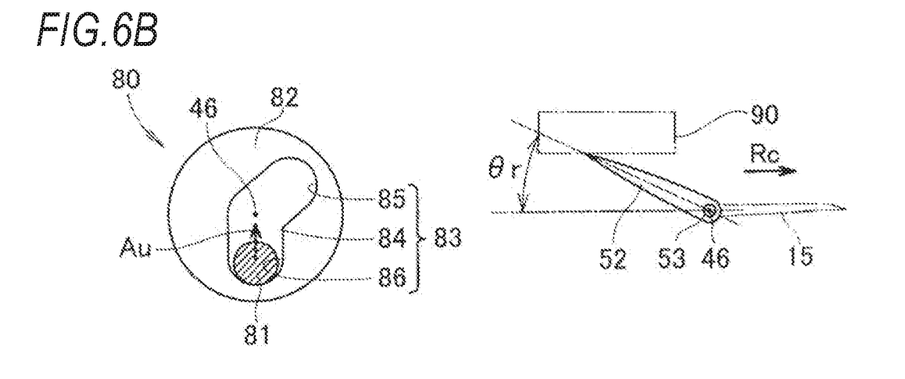
FIG. 6B is an explanatory view showing the relationship between the inclination angle of the cutting portion and the conversion mechanism when the cutting portion is in an inclined state (rotation angle θr>0°), that is, in a standby position.

Thereafter, the pin 81 is displaced downward (in a direction of an arrow Ad) together with the control shaft 71 and pushes up a side wall of the lower groove 86 of the cam groove 83. The cam portion 82 and the support shaft 53 are rotated in a clockwise direction, and thus the cutting portion 52 rotates upward. The result is shown in FIG. 6B. The cutting portion 52 may be polished by rotating the cutting portion 52 in a direction indicated by an arrow Rc. A size of the rotation angle θr by which the cutting portion 52 rotates upward from the horizontal state corresponds to a downward displacement amount of the control shaft 71 and the cutting portion 52 comes into contact with a grindstone 90.

Thereafter, when the pin 81 is displaced upward (in a direction of an arrow Au) together with the control shaft 71, the pin 81 is in a so-called idle swing state of being displaced upward just within the lower groove 86 until returning to the groove center 84, For this reason, the rotation angle θr of the cutting portion 52 does not change.

Figure 6C:
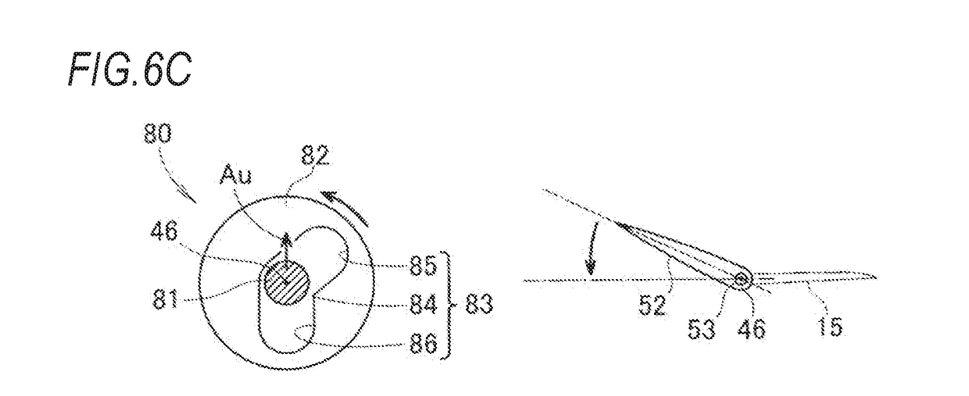
FIG. 6C is an explanatory view showing the relationship between the inclination angle of the cutting portion and the conversion mechanism when the cutting portion returns to the operating position from the standby position.
Figure 6D:
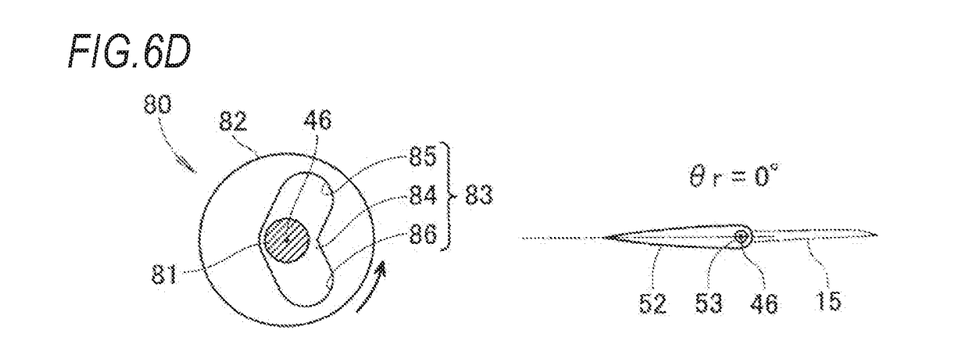
FIG. 6D is an explanatory view showing the relationship between the inclination angle of the cutting portion and the conversion mechanism after the cutting portion returns to the operating position.

Thereafter, as shown in FIG. 6C, the pin 81 is further displaced upward (in the direction of the arrow Au) from the groove center 84 and pushes up a side wall of the upper groove 85. The cam portion 82 and the support shaft 53 are rotated in a counterclockwise direction, and thus the cutting portion 52 rotates downward. The result is shown in FIG. 6D. The cutting portion 52 returns to the horizontal state (rotation angle θr=0°.

[Maintenance Tool]

As shown in FIG. 2, the grindstone 90 is provided in the housing 18 and may contact the cutting portion 52 of the blade 15 from above the blade 15. The cutting portion 52 of the blade 15 is movable between a maintenance position in which the cutting portion 52 may come into contact with the grindstone 90 by the cutting portion position changing mechanism 100 and an operating position in which lawn mowing is performed. Specifically, as shown in FIG. 6A, the cutting portion 52 is in the operating position when the rotation angle θr=0°. In this state, the cutting portion 52 may perform lawn mowing by rotating the blade 15 in the direction indicated by the arrow Rb. When rotated upward, as shown in FIG. 6B, the cutting portion 52 would be in the maintenance position and may come into contact with the grindstone 90. When the blade 15 is rotated in the direction of the arrow Rc opposite to the direction during lawn mowing in this state, a contacting part of the cutting portion 52 may be polished by the grindstone 90. During maintenance, that is, when the cutting portion 52 is in the maintenance position (polishing position), the speed of the blade 15 is preferably lower than that during lawn mowing, that is, when the cutting portion 52 is in the operating position. For example, a rotation speed of the lawn mowing motor 17 may be changed, or a gear ratio may be switched to decelerate the blade 15.

According to the lawn mower 10, by polishing the cutting portion 52 of the blade 15 using the grindstone 90 while the blade 15 is rotating, sharpness of the blade 15 can be prevented from reducing and white whiskers on cut grass can be prevented. Since the blade 15 can be polished without being detached from the lawn mower 10 or moving the lawn mower 10 to a specific location, maintenance work can be facilitated. Since the cutting portion 52 of the blade 15 is movable between the maintenance position in which the cutting portion 52 may come into contact with the grindstone 90 and the operating position in which lawn mowing is performed, the grindstone 90 can be avoided from interfering the lawn mowing.

Figure 7A:
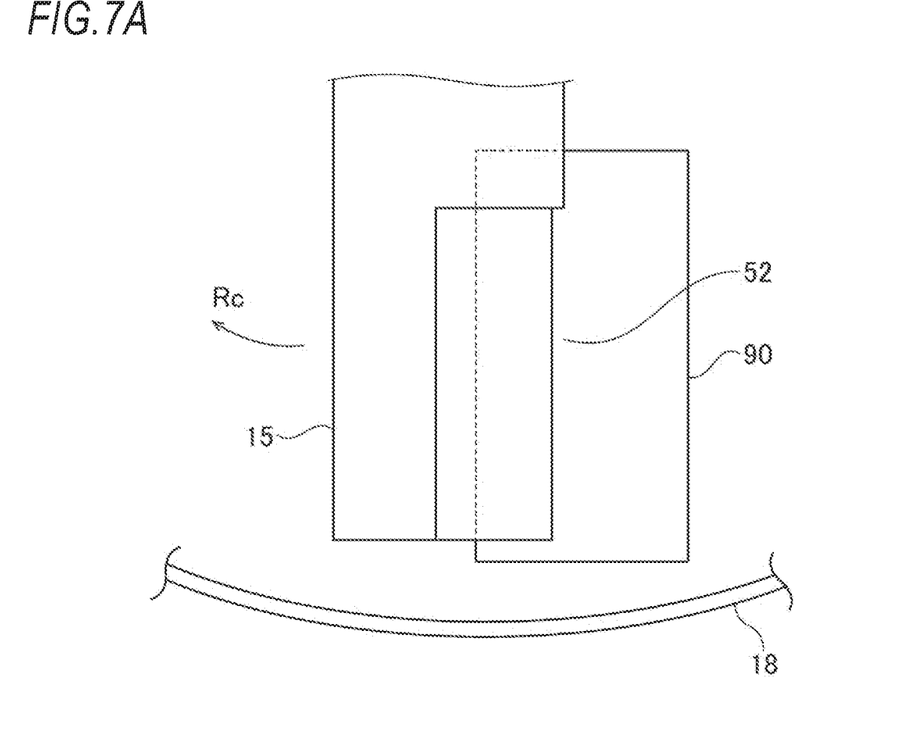
FIG. 7A is a bottom view of the blade and a grindstone during maintenance.
Figure 7B:
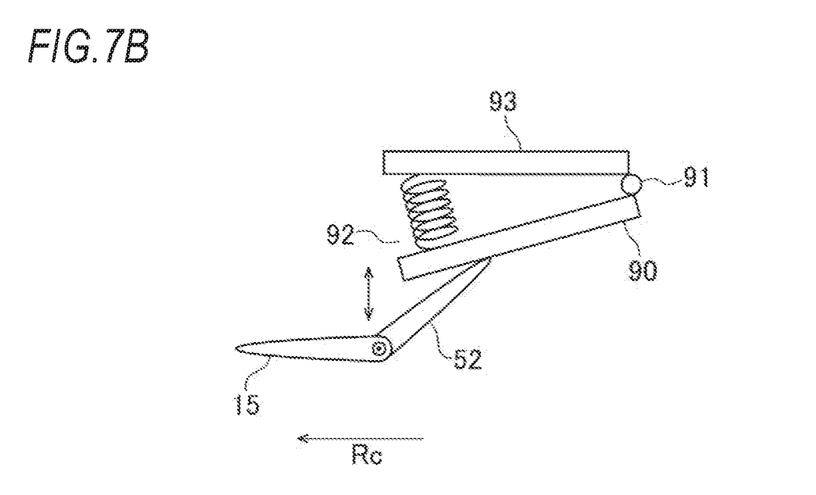
FIG. 7B is a side view of the blade and the grindstone during maintenance.

As shown in FIGS. 7A and 7B, the grindstone 90 preferably contacts the blade 15 obliquely relative to a rotation direction (the direction indicated by the arrow Rc) of the blade 15 during polishing. In this way, the cutting portion 52 of the blade 15 can be reliably brought into contact with the grindstone 90 and the cutting portion of the blade 15 can be sharpened effectively.

When a contact surface of the grindstone 90 is oblique relative to the rotation direction of the blade 15, the grindstone 90 is rotatably supported in the upper-lower direction with its upstream end portion in the blade rotation direction as a fulcrum (rotation shaft 91) and is biased toward the cutting portion 52 of the blade 15 by a spring 92. In this way, the grindstone 90 rotates along a contact surface of the cutting portion 52 of the blade 15 when the cutting portion 52 comes into contact with the grindstone 90. Accordingly, a contact area between the cutting portion 52 and the grindstone 90 is increased and the cutting portion 52 of the blade 15 can be efficiently polished.

The spring 92 adjusts contact pressure of the grindstone 90 to the cutting portion 52 of the blade 15. Accordingly, polishing efficiency can be prevented from reducing due to insufficient contact pressure and the cutting portion 52 of the blade 15 and the grindstone 90 can be prevented from being damaged by excessive contact pressure. In FIG. 7B, a reference numeral 93 denotes a grindstone support member that is fixed to the housing 18 and supports the grindstone 90. The grindstone support member 93 rotatably supports the grindstone 90 via the rotation shaft 91 and supports the spring 92 between the grindstone support member 93 and the grindstone 90. The spring 92 is formed of a compression coil spring.

The above embodiment may be appropriately modified, improved, or the like. For example, although the embodiment described a riding lawn mower, the present invention may be applied to a walk-behind lawn mower including a hand-pushed type and a self-propelled type or an autonomous traveling lawn mower. Although the above embodiment described a motor as a power source that rotates a blade, the power source may be an engine. Although the above embodiment described a grindstone as a maintenance tool, the maintenance tool may be a brush that removes mud or grass clippings adhering to the blade.

The present specification describes at least the following matters. Corresponding components in the above embodiment are shown in parentheses. However, the present invention is not limited thereto.

(1) A lawn mower (lawn mower 10) including:
a rotation shaft (rotation shaft 41) coupled to a power source and extending in an approximately vertical direction;
a blade (blade 15) configured to rotate integrally with the rotation shaft; and
a housing (housing 18) having a downward opening and accommodating the blade such that the blade is rotatable; and
a maintenance tool (grindstone 90) provided on the housing, the maintenance tool being contactable with the blade from the above,
wherein a cutting portion (cutting portion 52) of the blade is capable of moving between a maintenance position at which the cutting portion is contactable with the maintenance tool and an operating position at which the cutting portion mows a lawn.

According to (1), the cutting portion of the blade can be maintained without moving the lawn mower to a specific location. Accordingly, maintenance work can be facilitated. Since the cutting portion of the blade is movable between the maintenance position in Which the cutting portion may come into contact with the maintenance tool and the operating position in which lawn mowing is performed, the maintenance tool can be avoided from interfering with the lawn mowing.

(2) The lawn mower according to (1), further including:
a cutting portion position changing mechanism (cutting portion position changing mechanism 100) configured to change a position of the cutting portion such that the cutting portion has contact with the maintenance tool.

According to (2), the lawn mower includes the cutting portion position changing mechanism that changes the position of the cutting portion of the blade. Accordingly, the cutting portion of the blade can be arranged in an appropriate position during maintenance.

(3) The lawn mower according to (2),
wherein the blade includes:
a blade body (blade body 15*a*) configured to rotate integrally with the rotation shaft; and
the cutting portion (cutting portion 52) rotatably provided on the blade body, and
wherein the cutting portion is movable between the maintenance position and the operating position by rotating relative to the blade body.

According to (3), the cutting portion of the blade moves between the maintenance position and the operating position based on the rotation relative to the blade body. Accordingly, the cutting portion of the blade can be maintained without moving the entire blade.

(4) The lawn mower according to any one of (1) to (3),
wherein the maintenance tool is supported on the housing via an elastic member (spring 92) and is capable of adjusting contact pressure to the blade.

According to (4), the maintenance tool is supported in the housing via the elastic member. Accordingly, the pressure when the blade is pressed against the maintenance tool can be appropriately adjusted.

(5) The lawn mower according to any one of (1) to (4),
wherein the maintenance tool is a grindstone and the maintenance position is a polishing position.

According to (5), sharpness of the blade can be prevented from reducing and white whiskers on cut grass can be prevented by polishing the blade.

What is claimed is:

1. A lawn mower comprising:
a rotation shaft coupled to a power source and extending in an approximately vertical direction;
a blade configured to rotate integrally with the rotation shaft;
a housing having a downward opening and accommodating the blade during the blades rotation;
a maintenance tool provided on the housing, the maintenance tool being contactable with the blade from above; and
a cutting portion position changing mechanism configured to change a position of a cutting portion of the blade such that the cutting portion has contact with the maintenance tool,
wherein the cutting portion of the blade is capable of moving between a maintenance position at which the cutting portion is contactable with the maintenance tool and an operating position at which the cutting portion mows a lawn,
wherein the cutting portion position changing mechanism includes a conversion mechanism having a pin and a cam portion, and
wherein the conversion mechanism changes the position of the cutting portion between the maintenance position and the operating position by rotating the cam portion with a sliding movement of the pin.

2. The lawn mower according to claim 1,
wherein the blade comprises:
a blade body configured to rotate integrally with the rotation shaft; and
the cutting portion rotatably provided on the blade body, and
wherein the cutting portion is movable between the maintenance position and the operating position by rotating relative to the blade body.

3. The lawn mower according to claim 1,
wherein the maintenance tool is supported on the housing via an elastic member and is capable of adjusting contact pressure to the blade.

4. The lawn mower according to claim 1,
wherein the maintenance tool is a grindstone and the maintenance position is a polishing position.

5. The lawn mower according to claim 1,
wherein the maintenance tool contacts the blade obliquely relative to a rotation direction of the blade during polishing.

\* \* \* \* \*